(12) United States Patent
Kamiyama et al.

(10) Patent No.: US 9,399,372 B2
(45) Date of Patent: Jul. 26, 2016

(54) VEHICLE WHEEL

(71) Applicant: HONDA MOTOR CO., LTD., Tokyo (JP)

(72) Inventors: Youichi Kamiyama, Wako (JP); Katsushi Ishii, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/282,118

(22) Filed: May 20, 2014

(65) Prior Publication Data
US 2014/0346843 A1 Nov. 27, 2014

(30) Foreign Application Priority Data

May 21, 2013 (JP) ................................ 2013-106918

(51) Int. Cl.
*B60B 21/12* (2006.01)
*G10K 11/172* (2006.01)

(52) U.S. Cl.
CPC ........... *B60B 21/12* (2013.01); *B60B 2900/133* (2013.01); *G10K 11/172* (2013.01)

(58) Field of Classification Search
CPC ...... B60C 19/002; B60B 21/12; B60B 21/026
USPC ........... 152/381.5, 381.6, 400, 516, 518, 519, 152/520
See application file for complete search history.

(56) References Cited

U.S. PATENT DOCUMENTS

| | | | |
|---|---|---|---|
| 6,422,655 B1 * | 7/2002 | Britton | B60C 19/002 152/153 |
| 6,516,849 B2 * | 2/2003 | Flament | B60C 3/06 152/381.5 |
| 8,196,628 B2 * | 6/2012 | Fowler-Hawkins | B60C 19/002 152/339.1 |
| 2001/0007268 A1 * | 7/2001 | Yukawa | B60B 21/023 152/381.6 |

FOREIGN PATENT DOCUMENTS

| | | |
|---|---|---|
| CN | 101423005 A | 5/2009 |
| JP | 2008-120222 A | 5/2008 |
| JP | 2008-279911 A | 11/2008 |
| JP | 2010-52700 A | 3/2010 |
| JP | 2012-45971 A | 3/2012 |
| JP | 2012-51397 A | 3/2012 |

OTHER PUBLICATIONS

Office Action dated Mar. 19, 2015, issued in corresponding Japanese Patent Application No. 2013-106918. (4 pages).

(Continued)

*Primary Examiner* — John Walters
*Assistant Examiner* — James Triggs
(74) *Attorney, Agent, or Firm* — Westerman, Hattori, Daniels & Adrian, LLP (57) ABSTRACT

A vehicle wheel includes a main body fitted between a first vertical wall surface and a second vertical wall surface of the wheel, a first flange portion extending from the main body toward the first vertical wall surface, and a second flange portion extending from the main body toward the second vertical wall surface. In the vehicle wheel, a length of one of the flange portions is made shorter than a length of the other flange portion in a wheel width direction.

3 Claims, 9 Drawing Sheets

(56) References Cited

OTHER PUBLICATIONS

Chinese Office Action dated Oct. 30, 2015 (issuing date), issued in counterpart Chinese Patent Application No. 201410150522.X with English translation with English translation.

Japanese Office Action dated Oct. 6, 2015 (mailing date), issued in counterpart Japanese Patent Application No. 2013-106918 with English translation with English translation.

Japanese Office Action dated May 10, 2016 (mailing date), issued in counterpart Japanese Patent Application No. 2013-106918 with English translation with English translation.

* cited by examiner

VEHICLE WHEEL

CROSS REFERENCES TO RELATED APPLICATIONS

The present application claims priority under 35 U.S.C. §119 to Japanese Patent Application No. 2013-106918, filed May 21, 2013, entitled "VEHICLE WHEEL." The contents of this application are incorporated herein by reference in their entirety.

TECHNICAL FIELD

The present disclosure relates to a vehicle wheel.

BACKGROUND

As a conventional wheel that reduces road noise caused by air column resonance in a tire air chamber, a wheel in which a sub air chamber member that functions as a Helmholtz resonator is secured to an outer circumferential surface of a well portion in a tire air chamber, which one of the present inventors has already disclosed, is known (see, for example, FIGS. 2, 3, 9, etc. of Japanese Unexamined Patent Application Publication No. 2012-51397).

The wheel includes a first vertical wall surface, which is formed in a vertical wall provided to stand on an outer circumferential surface of a well portion so as to extend in a circumferential direction of the outer circumferential surface, and a second vertical wall surface, which is formed in one of rising portions of the well portion so as to extend in the circumferential direction and faces the first vertical wall surface in a width direction of the outer circumferential surface. A groove portion extending in the circumferential direction is formed on each of the first vertical wall surface and the second vertical wall surface, and the sub air chamber member is fitted between the first vertical wall surface and the second vertical wall surface.

The sub air chamber member includes a main body formed of resin and made up of a sub air chamber and a communication hole that allows the sub air chamber and the tire air chamber to communicate. The sub air chamber member further includes a first flange portion that is formed so as to extend from the main body toward the first vertical wall surface and extend in the circumferential direction and caught in the groove portion of the first vertical wall surface. The sub air chamber member further includes a second flange portion that is formed so as to extend from the main body toward the second vertical wall surface and extend in the circumferential direction and caught in the groove portion of the second vertical wall surface. The sub air chamber member is secured to the outer circumferential surface of the well portion by causing the first flange portion to be caught in the groove portion of the first vertical wall surface and causing the second flange portion to be caught in the groove portion of the second vertical wall surface. The cross section of the above-described sub air chamber member in the width direction is formed so as to have symmetry between left and right halves.

By the way, the radius or width of a wheel differs, depending on the size or form of a vehicle. Thus, when it is assumed to use a conventional wheel (see, for example, Japanese Unexamined Patent Application Publication No. 2012-51397) in a vehicle with a small wheel radius or width, the volume of a sub air chamber lessens as the wheel radius or width decreases.

However, when the volume of the sub air chamber lessens, the sub air chamber member decreases its silencing effect on an air column resonance sound in a tire air chamber and fails to sufficiently reduce road noise caused by the air column resonance sound in the tire air chamber.

Thus, the present application is aimed at providing a vehicle wheel that includes a sub air chamber member capable of ensuring a sufficient volume of a sub air chamber even when the wheel radius or width decreases.

SUMMARY

The present application conceived in view of the above describes a vehicle wheel that includes: a sub air chamber member on an outer circumferential surface of a well portion, the sub air chamber member functioning as a Helmholtz resonator in a tire air chamber; a first vertical wall surface formed on a vertical wall so as to extend in a circumferential direction of the outer circumferential surface, the vertical wall being provided to stand on the outer circumferential surface of the well portion; and a second vertical wall surface that is formed in one of rising portions of the well portion so as to extend in the circumferential direction and faces the first vertical wall surface in a width direction of the outer circumferential surface. In the vehicle wheel, a groove portion extending in the circumferential direction is formed on each of the first vertical wall surface and the second vertical wall surface, the sub air chamber member is fitted between the first vertical wall surface and the second vertical wall surface and includes: a main body formed of resin and includes a sub air chamber and a communication hole that allows the sub air chamber and the tire air chamber to communicate; a first flange portion formed so as to extend from the main body toward the first vertical wall surface and extend in the circumferential direction to be caught in the groove portion of the first vertical wall surface; and a second flange portion formed so as to extend from the main body toward the second vertical wall surface and extend in the circumferential direction to be caught in the groove portion of the second vertical wall surface, in a state in which one flange portion of the first flange portion and the second flange portion is caused to be partially caught in the groove portion of the vertical wall surface on a side of the one flange portion, all of other flange portion of the first flange portion and the second flange portion is pressed toward a side of the outer circumferential surface to cause all of the one flange portion to be caught in the groove portion of the vertical wall surface on the side of the one flange portion and cause the all of the other flange portion to be caught in the groove portion of the vertical wall surface on a side of the other flange portion, and the sub air chamber member is secured to the outer circumferential surface, and a length of the one flange portion in the width direction is made shorter than a length of the other flange portion in the width direction.

Since in the above-described vehicle wheel, the length of one of the first flange portion and the second flange portion in the width direction is made shorter than the length of the other of the first flange portion and the second flange portion in the width direction, the sub air chamber may be enlarged on the side of the flange portion that has the shorter length when compared to a conventional vehicle wheel that has symmetry between left and right halves and includes first and second flange portions with the same length (see, for example, Japanese Unexamined Patent Application Publication No. 2012-51397). Accordingly, the present application can provide a vehicle wheel that includes a sub air chamber capable of ensuring a sufficient volume of the sub air chamber even when the wheel radius or width decreases, and avoid a problem that as the volume of the sub air chamber lessens, the silencing effect on the air column resonance sound of the tire decreases and the road noise fails to be reduced sufficiently.

In addition, as described above, all of the other flange portion is pressed toward the side of the outer circumferential surface in securing the sub air chamber member to the well portion. However, since the length of the other flange portion in the width direction is longer than the length of the one flange portion in the width direction, the other flange portion easily bends when pressed and the sub air chamber member may be secured with favorable workability.

In the vehicle wheel, a pair of sub air chamber members may be arranged so as to face each other across a wheel center of rotation.

In such an vehicle wheel, since wheel unbalance (static balance) caused by one of the pair of sub air chamber members compensates for wheel unbalance (static balance) caused by the other sub air chamber member, a counter weight to be disposed to face the sub air chamber member in order to correct the wheel balance is unnecessary.

BRIEF DESCRIPTION OF THE DRAWINGS

The advantages of the disclosure will become apparent in the following description taken in conjunction with the following drawings.

DETAILED DESCRIPTION

A vehicle wheel of the present application includes a sub air chamber member (a Helmholtz resonator) that reduces road noise caused by air column resonance in a tire air chamber, on an outer circumferential surface of a well portion.

A major feature of the vehicle wheel is that one of a pair of flange portions of the sub air chamber member caught in the well portion is caused to have a length shorter than the length of the other flange portion. The sub air chamber member will be described in detail after describing an overall structure of the vehicle wheel.

Figure 1:
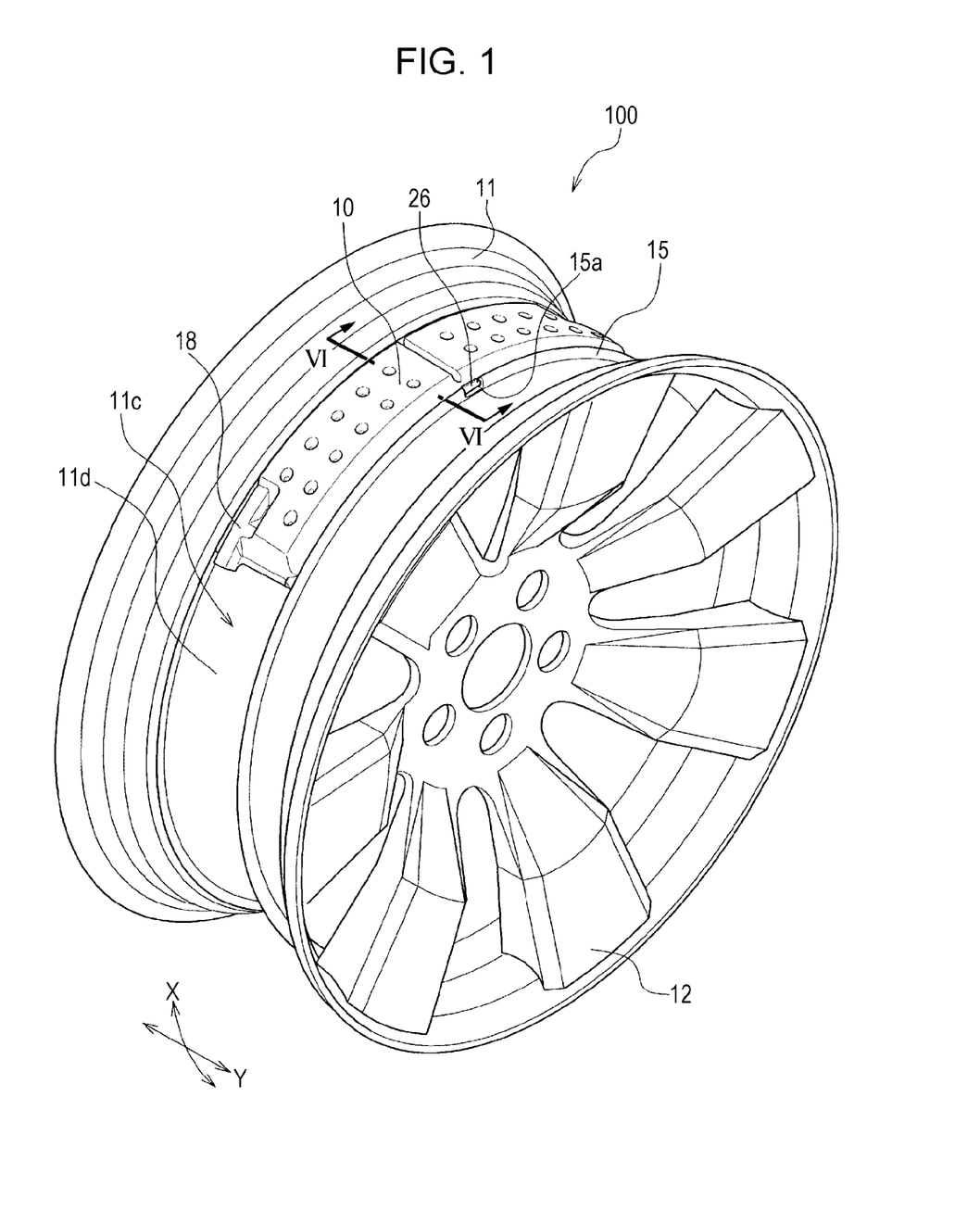
FIG. 1 is a perspective view of a vehicle wheel according to an embodiment of the present application.

FIG. 1 is a perspective view of a vehicle wheel 100 according to an embodiment of the present application.

As illustrated in FIG. 1, the vehicle wheel 100 includes a rim 11 and a disk 12 for coupling the rim 11 to a hub, which is not illustrated.

The rim 11 includes a well portion 11c depressed toward inside in a wheel radius direction (toward a center of rotation) between bead seat portions of a tire, which are formed in both end portions in a wheel width direction Y illustrated in FIG. 1.

The well portion 11c is provided so as to cause the bead portions of the tire to be settled, which are not illustrated, in mounting the tire not illustrated on the rim 11. In the present embodiment, the well portion 11c is formed to be shaped like a cylinder that has approximately the same radius in the wheel width direction Y.

In FIG. 1, reference numeral 11d denotes an outer circumferential surface of the well portion 11c. Reference numeral 18 denotes a tubular body through which a communication hole 20, which will be described later, is formed (see FIG. 2), and reference numeral 15 denotes an annular vertical wall provided to the outer circumferential surface 11d of the well portion 11c so as to extend in a circumferential direction of the rim 11. A sub air chamber member 10 is caught by the vertical wall 15 as described below. Reference numeral 15a denotes a notch portion of the vertical wall 15, in which a protruding portion 26 is fitted when the sub air chamber member 10 is caught by the vertical wall 15. In FIG. 1, reference letter X denotes a wheel circumferential direction.

The sub air chamber member 10 is now described.

Figure 2:
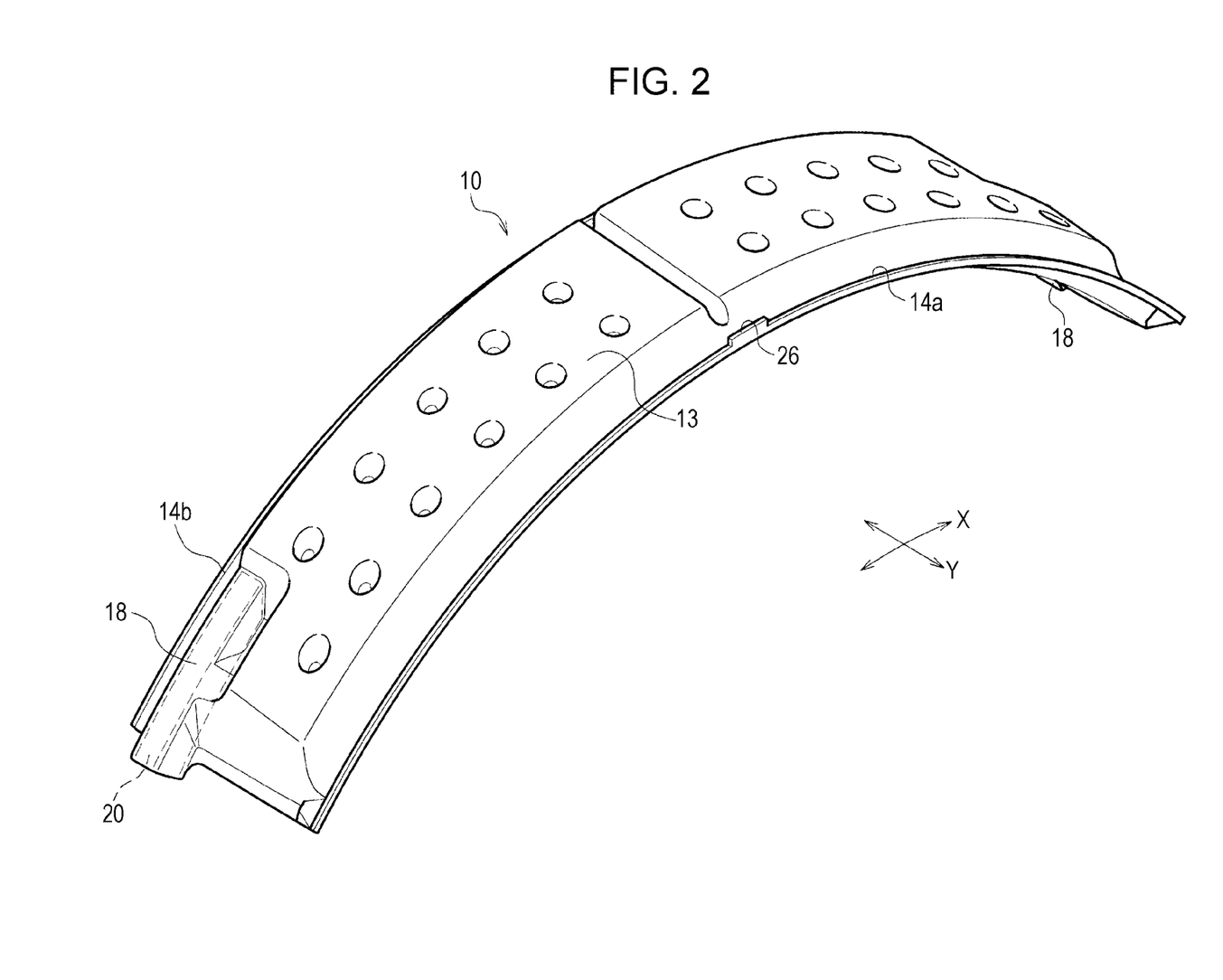
FIG. 2 is an overall perspective view of a sub air chamber member.

FIG. 2 is an overall perspective view of the sub air chamber member 10.

As illustrated in FIG. 2, the sub air chamber member 10 is long in one direction and includes a hollow main body 13 with a sub air chamber SC inside (see FIG. 4), which will be described later, and flange portions 14a and 14b.

The flange portion 14a may also be referred to as "first flange portion" and the flange portion 14b may also be referred to as "second flange portion".

The sub air chamber member 10 curves in a longitudinal direction and is along the wheel circumferential direction X when mounted on the outer circumferential surface 11d (see FIG. 1) of the well portion 11c (see FIG. 1). The tubular body 18 constitutes part of the main body 13 and the communication hole 20 that communicates with the sub air chamber SC (see FIG. 4) is formed inside the tubular body 18. The protruding portion 26, which will be described later, is provided to the flange portion 14a, and reference letter Y denotes the wheel width direction as mentioned above.

Figure 3A:
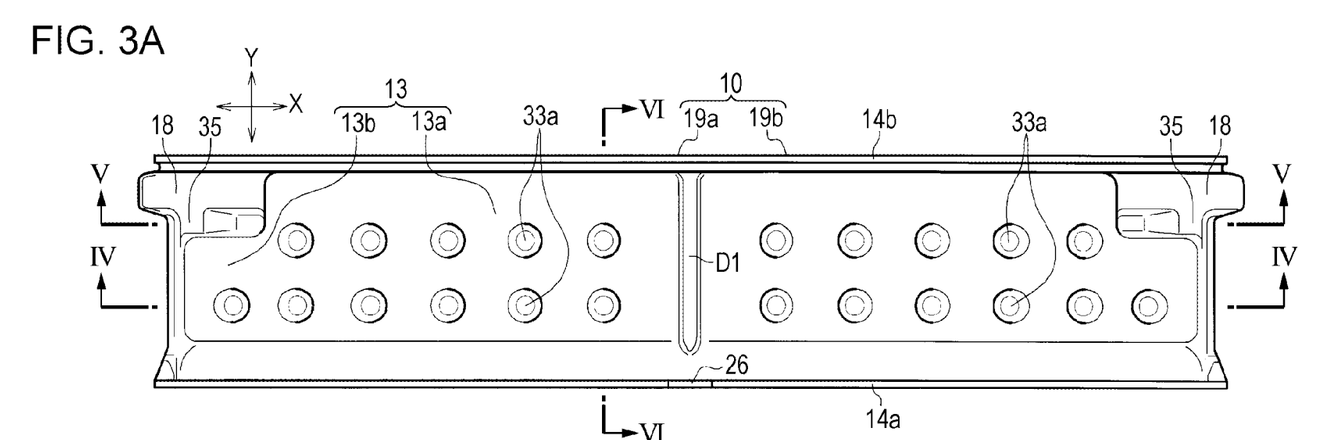
FIG. 3A is a top view of the sub air chamber member, which is viewed from a projection side of FIG. 2.
Figure 3B:
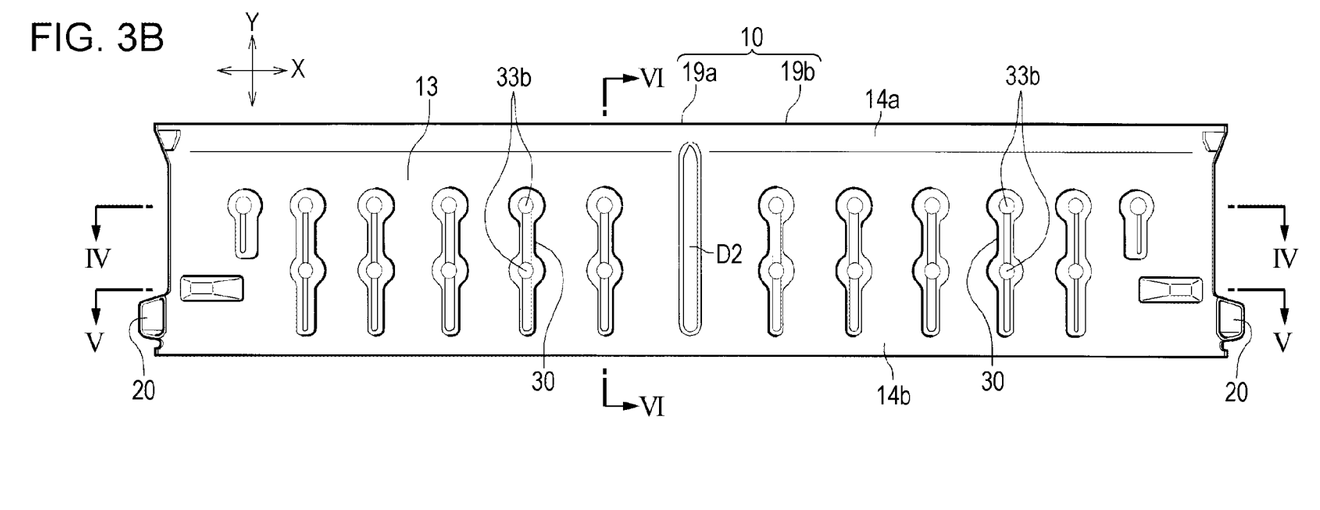
FIG. 3B is a bottom view of the sub air chamber member, which is viewed from a depression side of FIG. 2.

FIG. 3A referred to next is a top view of the sub air chamber member 10, which is viewed from a projection side of FIG. 2, and FIG. 3B is a bottom view of the sub air chamber member 10, which is viewed from a depression side of FIG. 2.

As illustrated in FIG. 3A, the sub air chamber member 10 is shaped like a long rectangle in a plan view. The planar shape of the main body 13 is approximately rectangular, which is smaller than the planar shape of the sub air chamber member 10 when regions in which the tubular body 18 and a joining portion 35, which will be described in detail later, are formed are included.

The main body 13 inside which the sub air chamber SC (see FIG. 4) described below is formed, that is, the main body 13 except the tubular body 18 and the joining portion 35 is shaped approximately like a hat in the top view (plan view) illustrated in FIG. 3A.

The part of the main body 13 in which the sub air chamber SC (see FIG. 4) is formed is made up of a crown portion and a brim portion of the approximate hat shape. In other words, the part of the main body 13 in which the sub air chamber SC is formed is mainly made up of a full-width portion 13a, which extends in the wheel circumferential direction X at a maximum width and corresponds to the crown portion, and an expanding portion 13b, which is provided in the wheel width direction Y in parallel with the tubular body 18, expands from the full-width portion 13a in the wheel circumferential direction X, and corresponds to the brim portion.

As illustrated in FIG. 3A, a groove D1 extends on the upper surface of the main body 13 (a projecting side of the sub air chamber member 10) in the width direction (the wheel width direction Y) at a center in the longitudinal direction of the main body 13 so as to cross the main body 13. As described below, the groove D1 is formed by an upper plate 25a (see FIG. 4) of the main body 13 being depressed toward a bottom plate 25b (see FIG. 4).

Further, as illustrated in FIG. 3B, a groove D2 extends on the lower surface of the main body 13 (a depressed side of the sub air chamber member 10) in the width direction (the wheel width direction Y) at the center in the longitudinal direction of the main body 13 so as to cross the main body 13. As described below, the groove D2 is formed by the bottom plate 25b (see FIG. 4) of the main body 13 being depressed toward the upper plate 25a (see FIG. 4).

The groove D1 and the groove D2 partially join the upper plate 25a and the bottom plate 25b together and constitute a partition wall W (see FIG. 4), which will be described later, and when the partition wall W divides a hollow portion of the main body 13 into two parts, a pair of sub air chambers SC (see FIG. 4), which will be described later, is formed inside the main body 13.

As illustrated in FIG. 3A, a pair of tubular bodies 18 is in both end portions in the longitudinal direction of the sub air chamber member 10 (the wheel circumferential direction X) and is arranged so as to be positioned on one of side edges in a short-length direction of the sub air chamber member 10 (the wheel width direction Y). Specifically, the tubular body 18 according to the present embodiment is arranged on the side of the flange portion 14b, which is one of the two flange portions 14a and 14b.

The tubular body 18 extends along the longitudinal direction of the sub air chamber member 10 (the wheel circumferential direction X). Each of the communication holes 20 (see FIG. 3B) formed in the pair of tubular bodies 18 allows the pair of sub air chambers SC (see FIG. 4) to communicate with outside individually. That is, the sub air chamber member 10 has a structure in which two Helmholtz resonators 19a and 19b are integrally formed while the grooves D1 and D2 serve as a boundary.

Each of the flange portions 14a and 14b extends from the main body 13 in the transverse direction of the sub air chamber member 10 (the wheel width direction Y). The flange portions 14a and 14b enable the sub air chamber member 10 to be caught in the well portion 11c (see FIG. 1). The flange portions 14a and 14b will be described in detail later.

In FIG. 3A, as mentioned above, reference numeral 26 denotes the protruding portion that will be described in detail later. Reference numeral 33a denotes an upper-side joining portion and in FIG. 3B, reference numeral 30 denotes a bead and reference numeral 33b denotes a lower-side joining portion. The upper-side joining portion 33a, the bead 30, and the lower-side joining portion 33b are described with reference to FIGS. 4 and 5.

Figure 4:
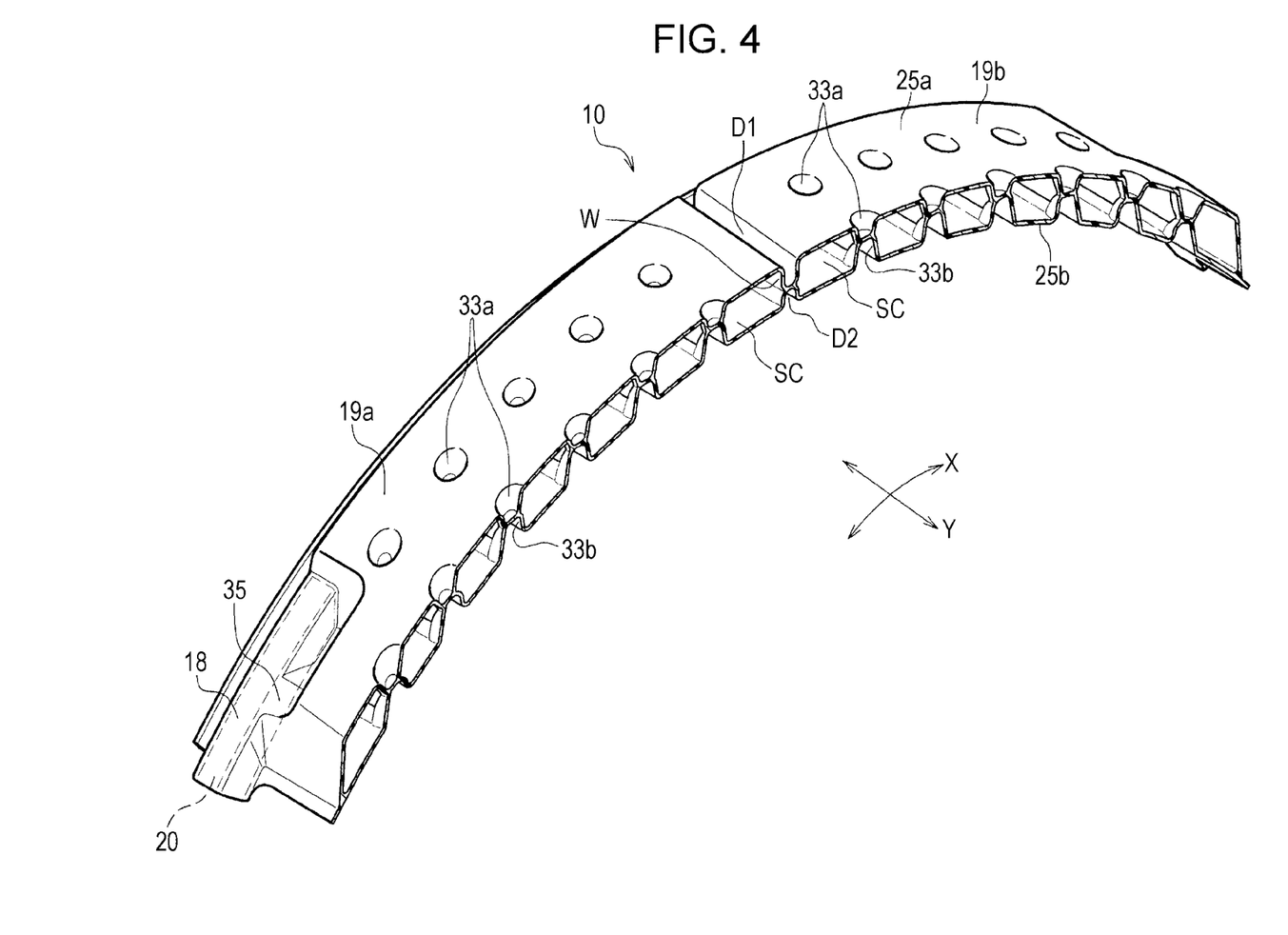
FIG. 4 is a perspective view illustrating the sub air chamber member cut along line IV-IV in FIG. 3A or 3B.
Figure 5:
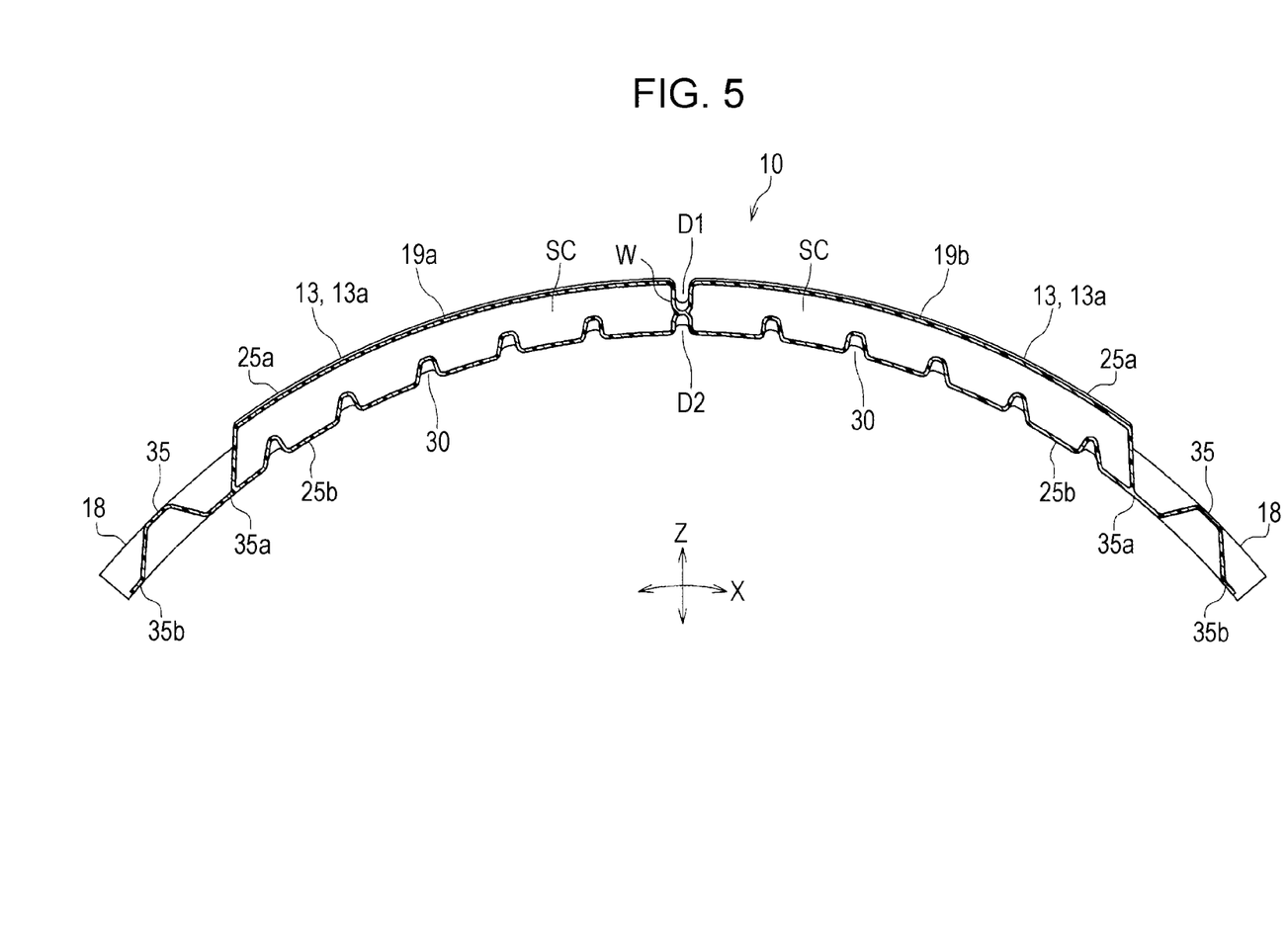
FIG. 5 is a cross sectional view taken along line V-V in FIG. 3A or 3B.

FIG. 4 is a perspective view illustrating the sub air chamber member 10 cut along line IV-IV in FIG. 3A or 3B. FIG. 5 is a cross sectional view taken along line V-V in FIG. 3A or 3B.

As illustrated in FIGS. 4 and 5, the main body 13 of the sub air chamber member 10 includes the bottom plate 25b and the upper plate 25a between which the sub air chamber SC is formed. Although resin materials of the upper plate 25a and the bottom plate 25b according to the present embodiment have the same thickness, the thicknesses may be different from each other.

The upper plate 25a forms the sub air chamber SC by curving over the bottom plate 25b, which is arranged along the outer circumferential surface 11d of the well portion 11c, so as to have a swell.

As illustrated in FIG. 4, the communication hole 20 of the tubular body 18 extending in the wheel circumferential direction X communicates with the sub air chamber SC at one end in the wheel circumferential direction X and is opened toward outside at the other end.

Each of the sub air chambers SC desirably has a volume of approximately 50 to 250 cc. When the volume of the sub air chamber SC is set within the range, each of the Helmholtz resonators 19a and 19b may sufficiently exert silencing effect while suppressing increase in weight and reducing the weight of the vehicle wheel 100. In addition, the length of the sub air chamber member 10 in the wheel circumferential direction X may be set as appropriate in view of adjustment of the weight of the vehicle wheel 100 or easiness in fixing the vehicle wheel 100 to the well portion 11c as long as a half of the circumferential length of the rim 11 (see FIG. 1) (the circumferential length of the outer circumferential surface 11d of the well portion 11c) is a maximum length.

The communication holes 20 allow a tire air chamber MC (see FIG. 6), which is formed between a tire (not illustrated) and the well portion 11c (see FIG. 1), and the sub air chambers SC to communicate over the well portion 11c (see FIG. 1).

The cross sectional shape of the communication hole 20 is not particularly limited and may be elliptical, circular, polygonal, or like the alphabetic letter D for example. The diameter of the communication hole 20 is desirably 5 mm or more when the cross sectional shape is circular. When the communication hole 20 has a cross sectional shape other than a circle, the communication hole 20 desirably has a diameter of 5 mm or more after converting the shape into a circle having a cross sectional area the same as the cross sectional area of the shape.

The length of the communication hole 20 is set so as to satisfy the following Expression 1 for determining a resonance vibration frequency of a Helmholtz resonator.

$$f_0 = C/2\pi \times \sqrt{(S/V(L+\alpha \times \sqrt{S}))} \quad \text{(Expression 1)}$$

In Expression 1, $f_0$ (Hz) represents the resonance vibration frequency, C (m/s) represents a velocity of sound inside the sub air chamber SC, which is equal to a velocity of sound inside the tire air chamber MC, V (m$^3$) represents the volume of the sub air chamber SC, L (m) represents the length of the communication hole 20, S (m$^2$) represents the cross sectional area of an opening of the communication hole 20, and α represents a correction coefficient.

The resonance vibration frequency $f_0$ is caused to match the resonance vibration frequency of the tire air chamber MC.

As illustrated in FIG. 4, the upper-side joining portions 33a are formed in portions of the upper plate 25a constituting the main body 13. The upper-side joining portions 33a are formed so that the upper plate 25a is depressed toward the bottom plate 25b, and are shaped like circles in a plan view. As illustrated in FIG. 2, the upper-side joining portions 33a are formed so as to be aligned in two lines extending along the longitudinal direction of the sub air chamber member 10 (the wheel circumferential direction X), the two lines are disposed one next to the other in the width direction of the main body 13. Specifically, as illustrated in FIG. 3A, a total of 20 upper-side joining portions 33a are formed in two lines in the full-width portion 13a, and one upper-side joining portion 33a is formed in each of the expanding portions 13b so that a total of two upper-side joining portions 33a are formed in both of the expanding portions 13b.

As illustrated in FIG. 4, the lower-side joining portions 33b are formed in the bottom plate 25b at positions corresponding to the upper-side joining portions 33a.

The lower-side joining portions 33b are formed so that the bottom plate 25b is depressed toward the upper plate 25a, and are shaped like circles in a plan view. End portions of the lower-side joining portions 33b are integrated with end portions of the upper-side joining portions 33a of the upper plate 25a, and the upper plate 25a and the bottom plate 25b are partially joined together.

The upper-side joining portions 33a and the lower-side joining portions 33b joined together inside the sub air chamber SC enhance the mechanical strength of the sub air chamber member 10 and implement a silencing function more effectively, which will be described later, by suppressing variation in the volume of the sub air chamber SC.

The present application may also employ a structure that does not include the upper-side joining portions 33a and the lower-side joining portions 33b.

As illustrated in FIGS. 4 and 5, in the sub air chamber member 10, the hollow portion of the main body 13 is partitioned by the partition wall W into two sub air chambers SC.

Further, as described above, in the sub air chamber member 10, the two Helmholtz resonators 19a and 19b are integrally formed while the partition wall W serves as a boundary.

As described above, the groove D1 formed on the upper plate 25a and the groove D2 formed on the bottom plate 25b are joined together to form the partition wall W, and the partition wall W according to the present embodiment forms the pair of sub air chambers SC by dividing the hollow portion of the main body 13 into two parts.

Since it is desirable enough that the partition wall W partitions the hollow portion of the main body 13 and two sub air chambers SC are formed, the partition wall W may be formed by, for example, joining the upper plate 25a and the bottom plate 25b together only with the groove D1 without forming the groove D2. Instead, the partition wall W may be formed by joining the upper plate 25a and the bottom plate 25b together only with the groove D2 without forming the groove D1.

The joining portion 35 formed between the expanding portion 13b of the main body 13 and the tubular body 18 is now described.

As illustrated in FIGS. 4 and 5, the joining portion 35 is formed by the upper plate 25a and the bottom plate 25b being joined together so as to be partially integrated between the expanding portion 13b and the tubular body 18.

Specifically, as illustrated in FIG. 5, the upper plate 25a and the bottom plate 25b are joined together and integrated at an end in the wheel circumferential direction X of the full-width portion 13a of the main body 13, and the joining portion 35 forms a base end 35a. Further, the joining portion 35 includes a bent plate body that forms a bent portion protruding toward outside in a wheel radius direction Z while extending in the wheel circumferential direction X from the base end 35a. The base end 35a and a top end 35b of the joining portion 35 according to the present embodiment are formed at the same height as the bottom plate 25b on the same curving surface in the wheel circumferential direction X.

As illustrated in FIG. 5, the above-mentioned bead 30 (see FIG. 3B) is formed by the bottom plate 25b being partially depressed toward the upper plate 25a. As illustrated in FIG. 3B, the beads 30 according to the present embodiment extend in the width direction of the sub air chamber member 10 (the wheel width direction Y) at positions at which the lower-side joining portions 33b are formed. That is, the beads 30 enhance the surface rigidity of the bottom plate 25b (see FIG. 5) by being joined to the lower-side joining portions 33b.

Figure 6:
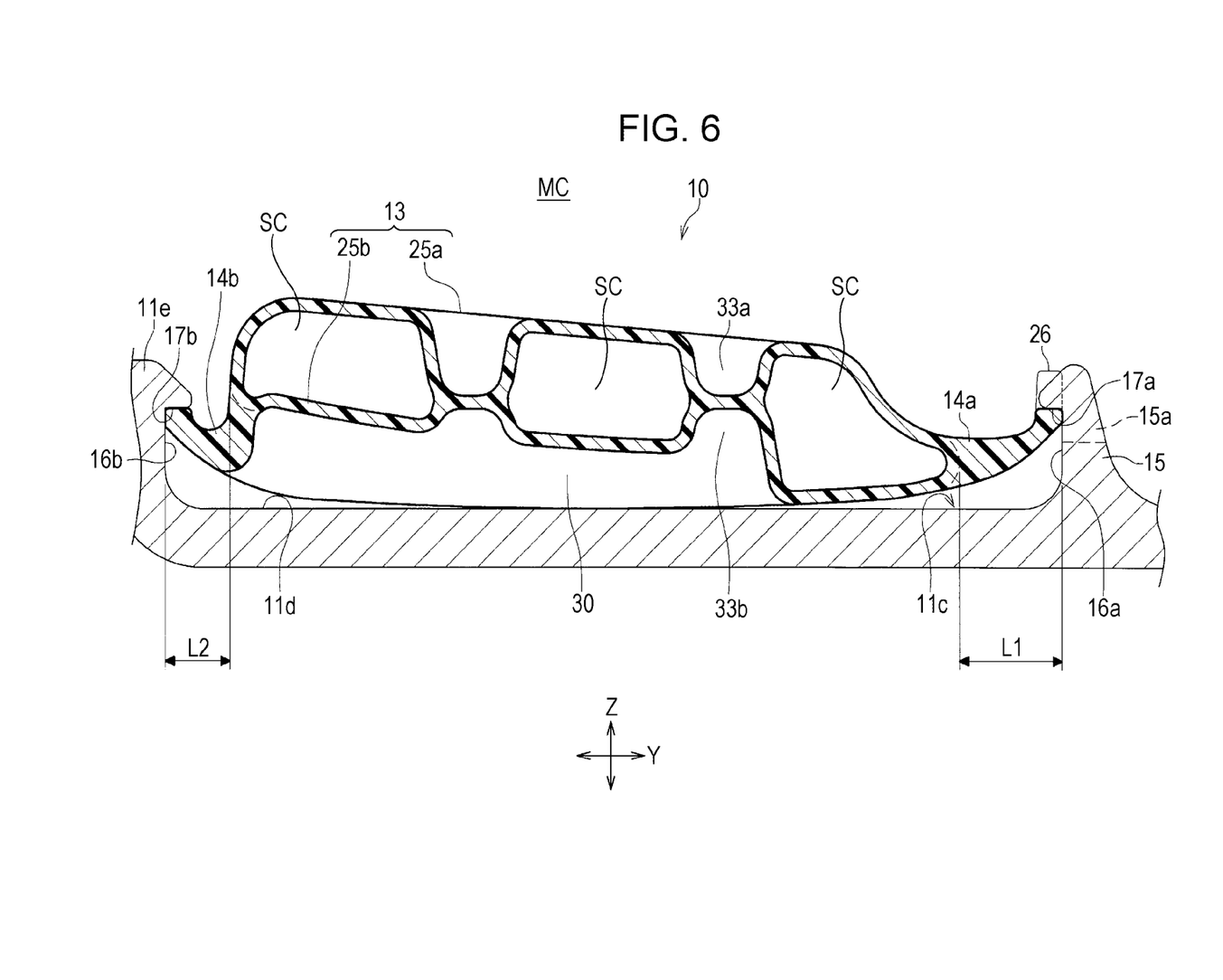
FIG. 6 is a cross sectional view taken along line VI-VI in FIG. 1, which includes the VI-VI cross section of the sub air chamber member in FIG. 3A or 3B.

How the sub air chamber member 10 is mounted on the well portion 11c (see FIG. 1) is now described. FIG. 6 is a cross sectional view taken along line VI-VI in FIG. 1, which includes the VI-VI cross section of the sub air chamber member 10 in FIG. 3A or 3B.

As illustrated in FIG. 6, the flange portion 14a and the flange portion 14b are formed so as to extend in the wheel width direction Y from the main body 13 made up of the upper plate 25a and the bottom plate 25b as described above.

The flange portion 14a extends from the main body 13 toward a first vertical wall surface 16a and a top end of the flange portion 14a is fitted in a groove portion 17a of the first vertical wall surface 16a. Further, the flange portion 14b extends from the main body 13 toward a second vertical wall surface 16b and a top end of the flange portion 14b is fitted in a groove portion 17b of the second vertical wall surface 16b.

The first vertical wall surface 16a is defined by a side surface inside the vertical wall 15 in the wheel width direction Y, which is on the right side in FIG. 6. Further, the second vertical wall surface 16b is defined by a side surface portion (rising portion) 11e of the well portion 11c, which faces the first vertical wall surface 16a. The groove portions 17a and 17b are formed along the circumferential direction of the outer circumferential surface 11d of the well portion 11c to form annular circumferential grooves. The vertical wall 15 and the side surface portion 11e according to the present embodiment are integrally formed with the well portion 11c in casting the rim 11 (see FIG. 1), and the groove portions 17a and 17b are formed by performing machining on each of the vertical wall 15 and the side surface portion 11e.

Further, in the present embodiment, a length L2 of the flange portion 14b, which is one of the flange portion 14a and the flange portion 14b, is shorter than a length L1 of the other flange portion 14a. The length L1 of the flange portion 14a is equal to a distance from an outside end of the main body 13 on the side of the first vertical wall surface 16a to a bottom of the groove portion 17a, and in the present embodiment, is equal to a distance from the outside end of the main body 13 to the first vertical wall surface 16a. The length L2 of the flange portion 14b is equal to a distance from another outside end of the main body 13 on the side of the second vertical wall surface 16b to a bottom of the groove portion 17b, and in the present embodiment, is equal to a distance from the other outside end of the main body 13 to the second vertical wall surface 16b.

The flange portion 14a and the flange portion 14b that extend toward the first vertical wall surface 16a and the second vertical wall surface 16b are integrated with the curving bottom plate 25b to form a curving surface that projects on the side of the outer circumferential surface 11d of the well portion 11c. Further, each of the flange portions 14a and 14b has spring elasticity by selecting a thickness or material therefor as appropriate.

In FIG. 6, as mentioned above, reference letters SC denote the sub air chamber, reference letters MC denote the tire air chamber formed between a tire (not illustrated) and the well portion 11c. Reference numeral 26 denotes the protruding portion fitted in a notch portion 15a of the vertical wall 15.

Figure 7A:
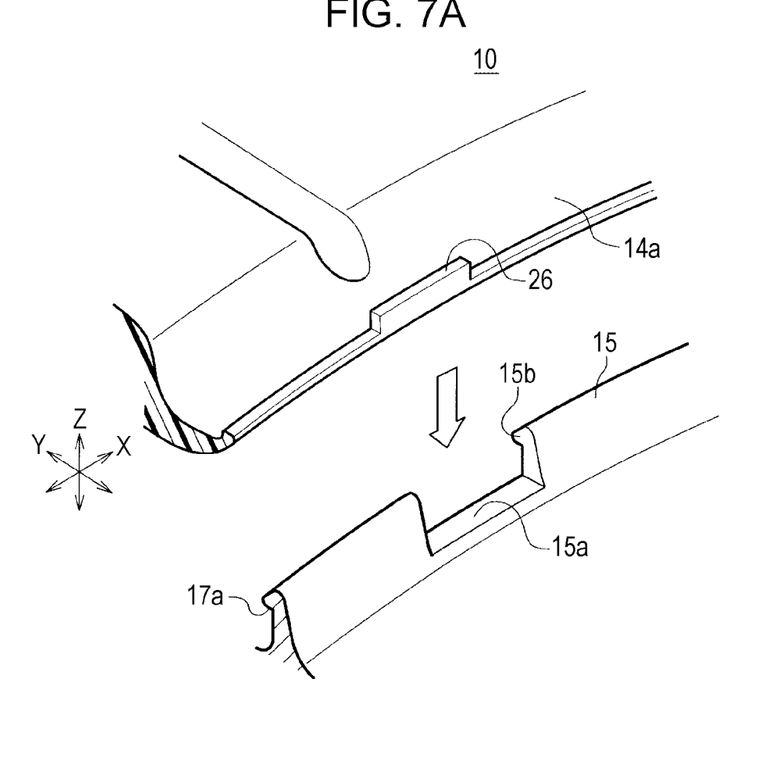
FIG. 7A is a partially-enlarged perspective view illustrating a periphery of a protruding portion of the sub air chamber member and a periphery of a cut portion formed in a vertical wall of a well portion.
Figure 7B:
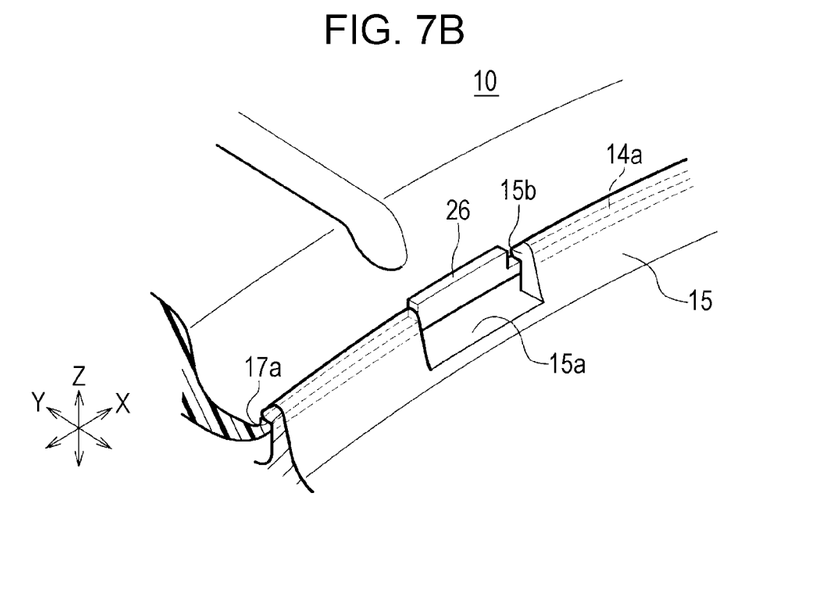
FIG. 7B is a partially-enlarged perspective view illustrating the protruding portion fitted in the cut portion.

FIG. 7A referred to next is a partially-enlarged perspective view illustrating a periphery of the protruding portion 26 of the sub air chamber member 10 and a periphery of the cut portion 15a formed in the vertical wall 15 of the well portion 11c, and FIG. 7B is a partially-enlarged perspective view illustrating the protruding portion 26 fitted in the notch portion 15a.

As illustrated in FIG. 7A, the protruding portion 26 includes a cut piece, which is a rectangular parallelepiped long in the wheel circumferential direction X and formed so as to protrude toward outside in the wheel radius direction Z (toward upside pointed by the allow Z) at a top end of the flange portion 14a of the sub air chamber member 10. The protruding portion 26 is formed so as to have a width in the wheel circumferential direction X suitable for the cut portion 15a formed in the vertical wall 15.

As illustrated in FIG. 7B, the protrusion height of the protruding portion 26 is set so that the protruding portion 26 is able to be in contact with an inside upper portion 15b of the notch portion 15a when the top end of the edge portion 14a is fitted in the groove portion 17a of the vertical wall 15.

Accordingly, when the flange portion 14a of the sub air chamber member 10 is caught in the vertical wall 15, the protruding portion 26 is fitted in the notch portion 15a of the vertical wall 15 and functions as a stopper that stops rotation of the sub air chamber member 10 in the wheel circumferential direction X.

The above-described sub air chamber member 10 according to the present embodiment is assumed to be formed of resin. When the sub air chamber member 10 is formed of resin, the resin desirably has a light weight and high rigidity so as to undergo blow molding in view of decrease in weight, increase in mass productivity, reduction in manufacturing cost, ensuring hermeticity of the sub air chamber SC, and the like. Among all, polypropylene resistant to repeated bending fatigue is particularly desirable.

The position of the sub air chamber member 10 in the vehicle wheel 100 according to the present embodiment is now described.

Figure 8A:
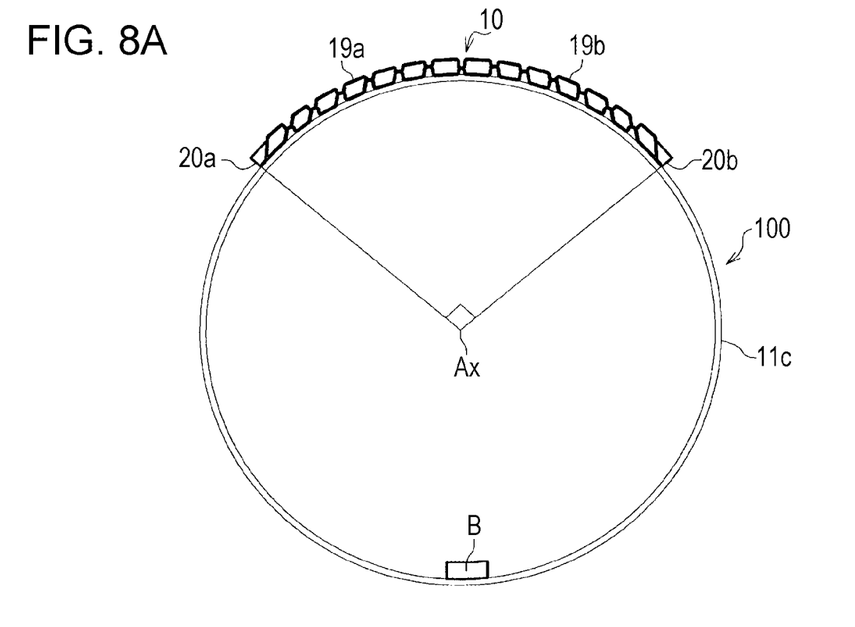
FIG. 8A is a schematic view illustrating how the sub air chamber member is arranged on the well portion in the vehicle wheel according to an embodiment of the present application.
Figure 8B:
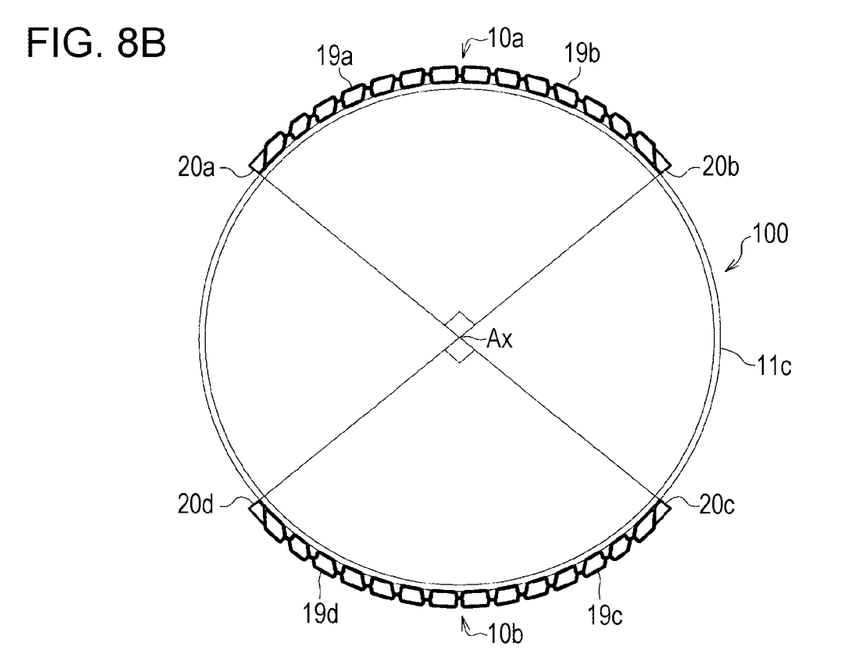
FIG. 8B is a schematic view illustrating how the sub air chamber member is arranged on the well portion in a vehicle wheel according to another embodiment.

FIG. 8A is a schematic view illustrating how the sub air chamber member 10 is arranged on the well portion 11c in the vehicle wheel 100 according to an embodiment of the present application, and FIG. 8B is a schematic view illustrating how the sub air chamber member 10 is arranged on the well portion 11c in the vehicle wheel 100 according to another embodiment.

As illustrated in FIG. 8A, in the vehicle wheel 100 according to the present embodiment, the two Helmholtz resonators 19a and 19b are integrally formed as described above, a communication hole 20a of the Helmholtz resonator 19a and a communication hole 20b of the Helmholtz resonator 19b are provided apart from each other in the circumferential direction about a wheel center Ax of rotation by an angle of 90°.

Reference letter B denotes a counter weight, which compensates for wheel unbalance (static balance) caused by mounting the sub air chamber member 10 on the well portion 11c.

The above-described vehicle wheel 100 may prevent so-called uneven silencing from occurring because of the communication holes 20a and 20b provided apart from each other in the circumferential direction about the wheel center Ax of rotation by an angle of 90°.

Further, as illustrated in FIG. 8B, in the vehicle wheel 100 according to the other embodiment, a first sub air chamber member 10a and a second sub air chamber member 10b are mounted on the well portion 11c so as to face across the wheel center Ax of rotation. The first sub air chamber member 10a and the second sub air chamber member 10b have structures similar to the structure of the sub air chamber member 10.

Respective communication holes 20a and 20b of two Helmholtz resonators 19a and 19b of the first sub air chamber member 10a, and respective communication holes 20c and 20d of two Helmholtz resonators 19c and 19d of the second sub air chamber member 10b are provided apart from each other in the circumferential direction about the wheel center Ax of rotation by an angle of 90°.

The above-described vehicle wheel 100 according to the other embodiment may prevent the uneven silencing from occurring while compensating for the wheel unbalance (static balance) caused by one of the first sub air chamber member 10a and the second sub air chamber member 10b with the wheel unbalance (static balance) caused by the other of the first sub air chamber member 10a and the second sub air chamber member 10b and thus, the counter weight B to be disposed to face the sub air chamber member 10 in order to correct the wheel balance becomes unnecessary.

Figure 9A:
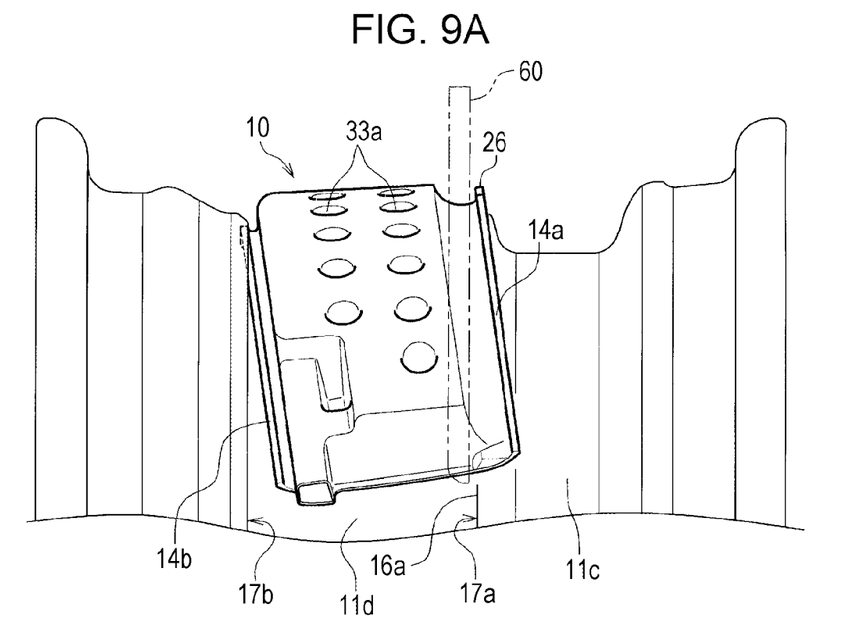
FIGS. 9A and 9B are illustrations for explaining a method of mounting the sub air chamber member on the well portion of a rim.
Figure 9B:
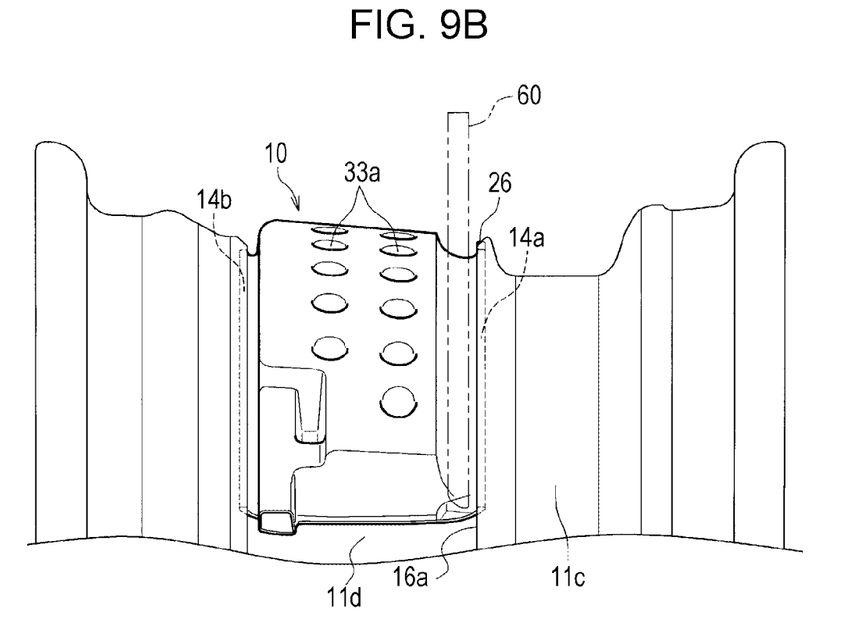

A method of mounting the sub air chamber member 10 on the well portion 11c is now described. FIGS. 9A and 9B are illustrations for explaining the method of mounting the sub air chamber member 10 on the well portion 11c.

As illustrated in FIGS. 9A and 9B, it is assumed in the present embodiment to use a pusher (pressing apparatus) 60 that presses the flange portion 14a toward the outer circumferential surface 11d of the well portion 11c at a position closer to the groove portion 17a in mounting the sub air chamber member 10 on the well portion 11c.

For example, the pusher 60 presses the flange portion 14a (see FIGS. 9A and 9B) with an air pressure of an air cylinder.

In FIGS. 9A and 9B, the pusher 60 is illustrated using an imaginary line (a chain double-dashed line) for drawing convenience.

Although the pusher 60 used in the present embodiment may be, for example, a plate-like member that includes an edge portion with an arc-shaped outline dependent on a curve rate in the longitudinal direction of the sub air chamber member 10 (the wheel circumferential direction X in FIG. 2), the pusher 60 applicable to the present application is not limited to the plate-like member and the design of the pusher 60 may be changed as appropriate.

As illustrated in FIG. 9A, in the mounting method, the sub air chamber member 10 is tilted first and the flange portion 14b with the shorter length is partially fitted in the groove portion 17b.

Then, the pusher 60 illustrated using the imaginary line in FIG. 9A is caused to come into contact with the flange portion 14a with the longer length. Reference numeral 11d denotes the outer circumferential surface of the well portion 11c as mentioned above.

After that, as illustrated in FIG. 9B, when the pusher 60 presses the flange portion 14a toward the outer circumferential surface 11d of the well portion 11c, the flange portion 14b of the sub air chamber member 10 is gradually fitted into the groove portion 17b as the tilt angle with respect to the outer circumferential surface 11d of the well portion 11c becomes smaller.

At this time, the flange portion 14a that has a spring elasticity and the longer length bends based on the magnitude of the pressure of the pusher 60.

Further, when the pusher 60 presses the flange portion 14a toward the outer circumferential surface 11d of the well portion 11c, as illustrated in FIG. 6, the flange portion 14a is fitted in the groove portion 17a formed on the first vertical wall surface 16a. At this time, the protruding portion 26 is fitted in the notch portion 15a of the vertical wall 15 (see FIG. 7B). When the flange portion 14a and the flange portion 14b are completely fitted in the groove portion 17a and the groove portion 17b, respectively, the sub air chamber member 10 is mounted on the well portion 11c.

Advantages that the vehicle wheel 100 of the present embodiment may bring are now described.

According to the vehicle wheel 100, since the length of the flange portion 14b (second flange portion) in the wheel width direction Y, which is one of the flange portion 14a (first flange portion) and the flange portion 14b (second flange portion), is made shorter than the length of the other flange portion 14a (first flange portion) in the wheel width direction Y, the sub air chamber SC may be enlarged on the side of the flange portion 14b (second flange portion) with the shorter length when compared to a conventional wheel that includes first and second flange portions that are symmetrical and have the same length. Such a conventional wheel is described in, for example, Japanese Unexamined Patent Application Publication No. 2012-51397, the entire contents of which are incorporated herein by reference. Thus, the vehicle wheel 100 may ensure a necessary amount of the volume of the sub air chamber SC even when the wheel radius or width decreases. Further, according to the vehicle wheel 100, it may be avoided that the silencing effect on the air column resonance sound of a tire decreases and the road noise fails to be sufficiently reduced as the volume of the sub air chamber SC lessens.

In addition, according to the vehicle wheel 100, when the sub air chamber member 10 is secured to the outer circumferential surface 11d of the well portion 11c, the length of the flange portion 14a in the wheel width direction Y pressed by the pusher 60 toward the outer circumferential surface 11d is longer than the length of the flange portion 14b in the wheel width direction Y. Thus, according to the vehicle wheel 100, the flange portion 14a easily bends when all of the flange portion 14a is pressed toward the outer circumferential surface 11d, and favorable workability may be maintained in securing the sub air chamber member 10 to the outer circumferential surface 11d.

Further, since the vehicle wheel 100 may ensure a large amount of the volume of the sub air chamber SC, flexibility in the design may be increased when the communication holes 20a and 20b are made apart from each other by an angle of 90° so as to prevent the occurrence of the uneven silencing.

Although the present embodiments are described above, the present application is not limited to the embodiments and may be implemented in various embodiments.

Although it is assumed in the above-described embodiments that the pusher 60 presses the entire flange portion 14a in a state in which the flange portion 14b with the length L2 shorter than the length L1 of the flange portion 14a is caused to be partially caught at the second vertical wall surface 16b, the present application may employ a structure in which the pusher 60 presses all of the flange portion 14b in a state in which the flange portion 14a is caused to be partially caught at the first vertical wall surface 16a after making the length L1 of the flange portion 14a shorter than the length L2 of the flange portion 14b.

Although the two Helmholtz resonators 19a and 19b are integrally formed in the sub air chamber member 10 in the above-described embodiments, only one Helmholtz resonator may be formed in the sub air chamber member in the vehicle wheel according to the present application.

We claim:

1. A vehicle wheel comprising:
   a well portion;
   a sub air chamber member disposed on an outer circumferential surface of the well portion, the sub air chamber member functioning as a Helmholtz resonator in a tire air chamber;
   a vertical wall being provided to stand on the outer circumferential surface of the well portion, the vertical wall having a first vertical wall surface extending in a circumferential direction of the outer circumferential surface,
   wherein the well portion including a rising portion, the rising portion including a second vertical wall surface extending in the circumferential direction and being opposite to the first vertical wall surface in a width direction of the outer circumferential surface, wherein
   the first vertical wall surface includes a first groove portion extending in the circumferential direction and the second vertical wall surface includes a second groove portion extending in the circumferential direction,
   the sub air chamber member is fitted between the first vertical wall surface and the second vertical wall surface and includes:
      a main body formed of resin and including a sub air chamber and a communication hole communicating the sub air chamber with the tire air chamber;
      a first flange portion extending from the main body toward the first vertical wall surface and extending in the circumferential direction, the first flange portion being engaged with the first groove portion of the first vertical wall surface; and
      a second flange portion extending from the main body toward the second vertical wall surface and extending in the circumferential direction, the second flange portion being engaged with the second groove portion of the second vertical wall surface,
   in a state in which one of the first flange portion and the second flange portion is caused to be partially engaged in the corresponding one of the first groove portion and the second groove portion, the other of the first flange portion and the second flange portion is entirely pressed toward the outer circumferential surface to cause the one of the first flange portion and the second flange portion to be engaged in the corresponding one of the first groove portion and the second groove portion and cause the other of the first flange portion and the second flange portion to be engaged in the corresponding one of the first groove portion and the second groove portion, such that the sub air chamber member is secured to the outer circumferential surface, and
   wherein the one of the first flange portion and the second flange portion includes a length in the width direction shorter than a length of the other of the first flange portion and the second flange portion.

2. The vehicle wheel according to claim 1, comprising a pair of the sub air chamber members disposed so as to face each other across a wheel center of rotation.

3. The vehicle wheel according to claim 1, wherein the one of the first flange portion and the second flange portion is disposed adjacent to the sub air chamber.

* * * * *